(12) United States Patent
Wang et al.

(10) Patent No.: US 12,192,594 B2
(45) Date of Patent: Jan. 7, 2025

(54) METHOD, APPARATUS, DEVICE, AND STORAGE MEDIUM OF VIDEO PROCESSING

(71) Applicant: Beijing Zitiao Network Technology Co., Ltd., Beijing (CN)

(72) Inventors: Yitian Wang, Beijing (CN); Wozhou He, Beijing (CN); Mingjie Chen, Beijing (CN); Peihua Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/536,092

(22) Filed: Dec. 11, 2023

(65) Prior Publication Data
US 2024/0114216 A1  Apr. 4, 2024

Related U.S. Application Data

(63) Continuation of application No. PCT/CN2022/117803, filed on Sep. 8, 2022.

(30) Foreign Application Priority Data

Sep. 15, 2021 (CN) .......................... 202111081785.6

(51) Int. Cl.
*G06F 40/166* (2020.01)
*H04N 21/81* (2011.01)
*G11B 27/031* (2006.01)

(52) U.S. Cl.
CPC ......... *H04N 21/816* (2013.01); *G06F 40/166* (2020.01); *G11B 27/031* (2013.01)

(58) Field of Classification Search
CPC ... H04N 21/816; G06F 40/166; G06F 16/432; G11B 27/031
See application file for complete search history.

(56) References Cited

U.S. PATENT DOCUMENTS 7,512,537 B2 * 3/2009 Pahud ..................... G06T 13/00
  704/235
10,140,259 B2 * 11/2018 Iyer ....................... G06F 40/106
(Continued)

FOREIGN PATENT DOCUMENTS

CN    108259965 A    7/2018
CN    109756751 A    5/2019
(Continued)

OTHER PUBLICATIONS

International Patent Application No. PCT/CN2022/117803; Int'l Search Report; dated Nov. 30, 2022; 3 pages.
(Continued)

*Primary Examiner* — Phuoc Tran
(74) *Attorney, Agent, or Firm* — BakerHostetler

(57) ABSTRACT

The present disclosure provides a video processing method, device, apparatus, and a storage medium. The method includes: displaying a material editing area for video editing based on a first script structure, the material editing area divided into a plurality of sub-areas; displaying a target multimedia material according to a timeline in a target sub-area of the plurality of sub-areas, the target multimedia material being a multimedia material selected for a target script node that is a script node corresponding to the target sub-area in the first script structure; and generating the target video based on multimedia material displayed in the material editing area. Based on a material editing area including a plurality of sub-areas respectively corresponding to script nodes, embodiments of the present disclosure can implement video editing, and diversify the video editing methods to further meet various people's needs for video editing.

20 Claims, 8 Drawing Sheets

(56) References Cited

U.S. PATENT DOCUMENTS

| | | |
|---|---|---|
| 2007/0061728 A1 | 3/2007 | Sitomer et al. |
| 2010/0153520 A1* | 6/2010 | Daun .................. G11B 27/034 |
| | | 709/218 |
| 2010/0322589 A1 | 12/2010 | Henderson et al. |
| 2020/0126583 A1 | 4/2020 | Pokharel et al. |
| 2020/0273493 A1* | 8/2020 | Huber .................. G11B 27/34 |
| 2021/0110164 A1* | 4/2021 | Mehta .................. G06V 40/169 |

FOREIGN PATENT DOCUMENTS

| | | |
|---|---|---|
| CN | 109889882 A | 6/2019 |
| CN | 111711855 A | 9/2020 |
| CN | 112040142 A | 12/2020 |
| CN | 112579826 A | 3/2021 |

OTHER PUBLICATIONS

Communication pursuant to Rules 70(2) and 70a(2) EPC for European Application No. 22869112.7, mailed on Oct. 1, 2024, 1 page.
European Patent Application No. 22869112.7; Extended Search Report; dated Sep. 12, 2024; 7 pages.

* cited by examiner

METHOD, APPARATUS, DEVICE, AND STORAGE MEDIUM OF VIDEO PROCESSING

CROSS REFERENCE TO RELATED APPLICATIONS

This application is a Continuation Application of International Patent Application No. PCT/CN2022/117803, filed Sep. 8, 2022, which claims the priority to the Chinese Application No. 202111081785.6 filed on Sep. 15, 2021, the disclosures of which are hereby incorporated by reference in their entities.

FIELD

The present disclosure generally relates to the field of computers, and more specifically, to a method, an apparatus, a device, and a storage medium of video processing.

BACKGROUND

With the development of computer technologies, more application scenarios of videos are witnessed in work and life, and people have more diverse needs for video editing.

Therefore, how to meet various people's needs for video editing is a technical problem to be solved.

SUMMARY

To solve, or at least partly solve, the above-mentioned technical problem, embodiments of the present disclosure provide a method, an apparatus, a device, and a storage medium.

In a first aspect, the present disclosure provides a method of video processing, comprising:
  displaying, based on a first script structure, a material editing area for video editing, wherein the material editing area is divided into a plurality of sub-areas, a sub-area is corresponding to a script node in the first script structure, the first script structure is used to indicate a content paragraph structure of a target video, the script node is used to indicate a content paragraph of the target video;
  displaying a target multimedia material according to a timeline in a target sub-area of the plurality of sub-areas, the target multimedia material being a multimedia material selected for a target script node which is the script node corresponding to the target sub-area in the first script structure; and
  generating the target video based on multimedia material displayed in the material editing area, wherein the target multimedia material is filled in a target content paragraph of the target video, and the target content paragraph is corresponding to the target script node.

In an alternative implementation, an interface layout of the plurality of sub-areas in the material editing area is a vertical alignment arrangement.

In an alternative implementation, prior to generating the target video based on the multimedia material displayed in the material editing area, the method further comprises:
  in response to an adjustment operation on a target text content of a first script node in the first script structure, determining a multimedia material corresponding to the first script node in the material editing area, and determining a multimedia clip corresponding to the target text content in the multimedia material; and
  editing, based on the adjustment operation, the multimedia clip in the multimedia material.

In an alternative implementation, prior to generating the target video based on the multimedia material displayed in the material editing area, the method further comprises:
  in response to an operation of adding a text content at a target text position of a second script node in the first script structure, determining a multimedia material corresponding to the second script node in the material editing area, and determining a timeline position corresponding to the target text position in the multimedia material; and
  adding, based on the operation of adding the text content, adding a multimedia clip corresponding to the text content at the timeline position in the multimedia material.

In an alternative implementation, prior to generating the target video based on the multimedia material displayed in the material editing area, the method further comprises:
  in response to an editing operation on a target multimedia clip of a first multimedia material in the material editing area, determining the script node corresponding to the first multimedia material, and determining a text content corresponding to the target multimedia clip in the script node; and
  adjusting, based on the editing operation, the text content in the script node.

In an alternative implementation, prior to generating the target video based on the multimedia material displayed in the material editing area, the method further comprises:
  in response to an operation of adjusting a sequence of a second script node and a third script node in the first script structure, determining sub-areas respectively corresponding to the second script node and the third script node in the material editing area; and
  adjusting, based on the operation of adjusting the sequence, a sequence of multimedia material in the sub-areas respectively corresponding to the second script node and the third script node in the material editing area.

In an alternative implementation, the target multimedia material comprises a candidate multimedia material, and prior to generating the target video based on the multimedia material displayed in the material editing area, and the method further comprises:
  in response to a switching operation from the target multimedia material in the target sub-area to the candidate multimedia material, switching the target multimedia material displayed in the target sub-area to the candidate multimedia material.

In a second aspect, the present disclosure further provides a video processing apparatus, comprising:
  a first displaying module for displaying a material editing area based on a first script structure, wherein the material editing area is divided into a plurality of sub-areas, a sub-area is corresponding to a script node in the first script structure, the first script structure is used to indicate a content paragraph structure of a target video, the script node is used to indicate a content paragraph of the target video;
  a second displaying module for displaying a target multimedia material according to a timeline in a target sub-area of the plurality of sub-areas, wherein the target multimedia material is selected for a target script node which is the script node corresponding to the target sub-area in the first script structure; and a generating module for generating the target video based on multimedia material displayed in the material editing area, wherein the target multimedia material is filled in a target content paragraph of the target video, and the target content paragraph is corresponding to the target script.

In a third aspect, the present disclosure provides a computer readable storage medium having instructions stored therein which, when running on a terminal device, cause the terminal device to implement the method as described above.

In a fourth aspect, the present disclosure provides a device comprising a memory, a processor, and computer programs stored in the memory and operable on the processor, where the processor, when executing the computer programs, implements the method as described above.

In a fifth aspect, the present disclosure provides computer programs/instructions which, when executed by a processor, implement the method as described above.

As compared with the prior art technology, the technical solution according to embodiments of the present disclosure at least has the following advantages:

Embodiments of the present disclosure provide a method of video processing, where a material editing area for video editing is displayed based on a first script structure, which allows sub-areas therein respectively correspond to script nodes in the first script structure. In addition, in a target sub-area of the material editing area, a multimedia material selected for a target script node corresponding to the target sub-area is displayed according to a timeline, and the target video is then generated based on multimedia material displayed in the material editing area. Based on the material editing area including a plurality of sub-areas corresponding to script nodes, the embodiments of the present disclosure can implement video editing, and diversify methods of video processing, to further meet various people's need for video editing.

BRIEF DESCRIPTION OF THE DRAWINGS

Drawings which are incorporated into the Description and form a part thereof depict embodiments in line with the Description and are provided, together with the Description, to explain the principles of the present disclosure.

In order to make clear the technical solution according to embodiments of the present disclosure or the prior art technology, brief introduction will be provided below on the drawings necessary for the embodiments or the prior art technology. Based on the drawings, the ordinary skilled in the art could obtain other drawings apparently, without doing creative work.

DETAILED DESCRIPTION OF EMBODIMENTS

In order to make the objective, features, and advantages of the present disclosure more apparent, further description on the solution of the present disclosure will be provided below. It is worth noting that the features in an embodiment and embodiments of the present disclosure could be combined in the absence of conflict.

For a better understanding of the present disclosure, more details will be provided below; however, the present disclosure could also be implemented in other manners than the one described here. Obviously, the embodiments described here are only a part of embodiments of the present disclosure, rather than all of them.

In order to meet various users' needs for video editing and diversify video processing, embodiments of the present disclosure provide a method of video processing, including: first of all, displaying a material editing area for video editing based on a first script structure, where the material editing area is divided into a plurality of sub-areas each corresponding to a script node in a first script structure, the first script structure indicates a content paragraph structure of a target video, and one of the script nodes indicates a content paragraph of the target video; then, displaying a target multimedia material according to timeline in a target sub-area in the plurality of sub-areas, where the target multimedia material is selected for a target script node that is the script node corresponding to the target sub-area in the first subscript structure; further, generating the target video based on multimedia material displayed in the material editing area, where the target multimedia material is filled in a target content paragraph of the target video, and the target content paragraph corresponds to the target script node.

In the embodiments of the present disclosure, the material editing area for video editing is displayed based on the first script structure, which allows sub-areas in the material editing area to respectively correspond to script nodes in the first script structure. Moreover, in a target sub-area of the material editing area, a multimedia material selected for a target script node corresponding to the target sub-area is displayed according to timeline, and the target video is then generated based on multimedia material displayed in the material editing area. Based on a material editing area including a plurality of sub-areas corresponding to script nodes, the embodiments of the present disclosure can implement video editing, and diversify methods of video processing, to further meet various people's needs for video editing.

Figure 1:
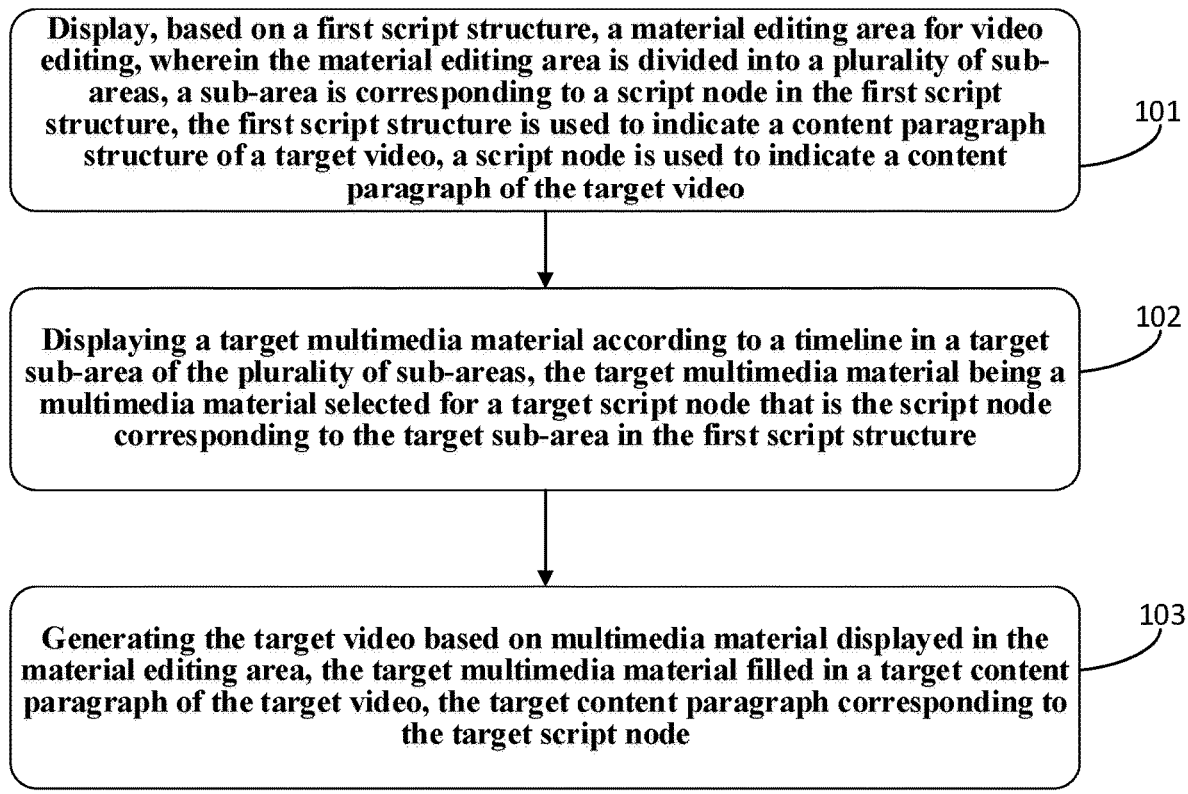
FIG. 1 illustrates a schematic flowchart of a method of video processing provided by embodiments of the present disclosure.

In view of the above, embodiments of the present disclosure provide a method of video processing. FIG. 1 illustrates a schematic flowchart of a method of video processing provided by embodiments of the present disclosure. The method can be implemented by a video processing apparatus, where the apparatus can be implemented using software and/or hardware, and is typically integrated in an electronic device.

As shown in FIG. 1, the method may include:

Step 101, displaying a material editing area for video editing based on a first script structure.

Wherein, the material editing area is divided into a plurality of sub-areas each corresponding to the script node in a first script structure, the first script structure indicates a content paragraph structure of a target video, and the script node indicates a content paragraph of the target video.

The script, the raw material of film or television creation, typically includes a description of a plurality of images, to instruct a photographer to shoot and create corresponding film or television works. For example, the script includes a related description of an image to indicate shooting of a first shot, a related description of an image b to indicate shooting of a second shot, and the like. During film or television creation, the photographer can obtain a first shot containing a video clip A based on the description of the image a, and a second shot containing a video clip B based on the description of the image b, and then can obtain the film or television works corresponding to the script after splicing the second shot after the first shot.

In those embodiments, the first script structure may refer to a structure of the script as mentioned above, for example, a structure describing content paragraphs, or the like. It would be appreciated that the descriptions respectively corresponding to the first and second shots included in the script in the above example correspond to script nodes in the first script structure, respectively. For example, the description of the first shot corresponds to a first script node in the first script structure, and the description of the second shot corresponds to a second script node in the first script structure.

In those embodiments, after determining the first script structure, the material editing area for video editing is displayed based on the first script structure, and the multimedia material to be edited may be displayed in the material editing area. Specifically, the material editing area may be divided based on script nodes in the first script structure, to obtain a respective sub-area corresponding to each script node. Wherein, each sub-area corresponds to a script node in the first script structure.

Figure 2:
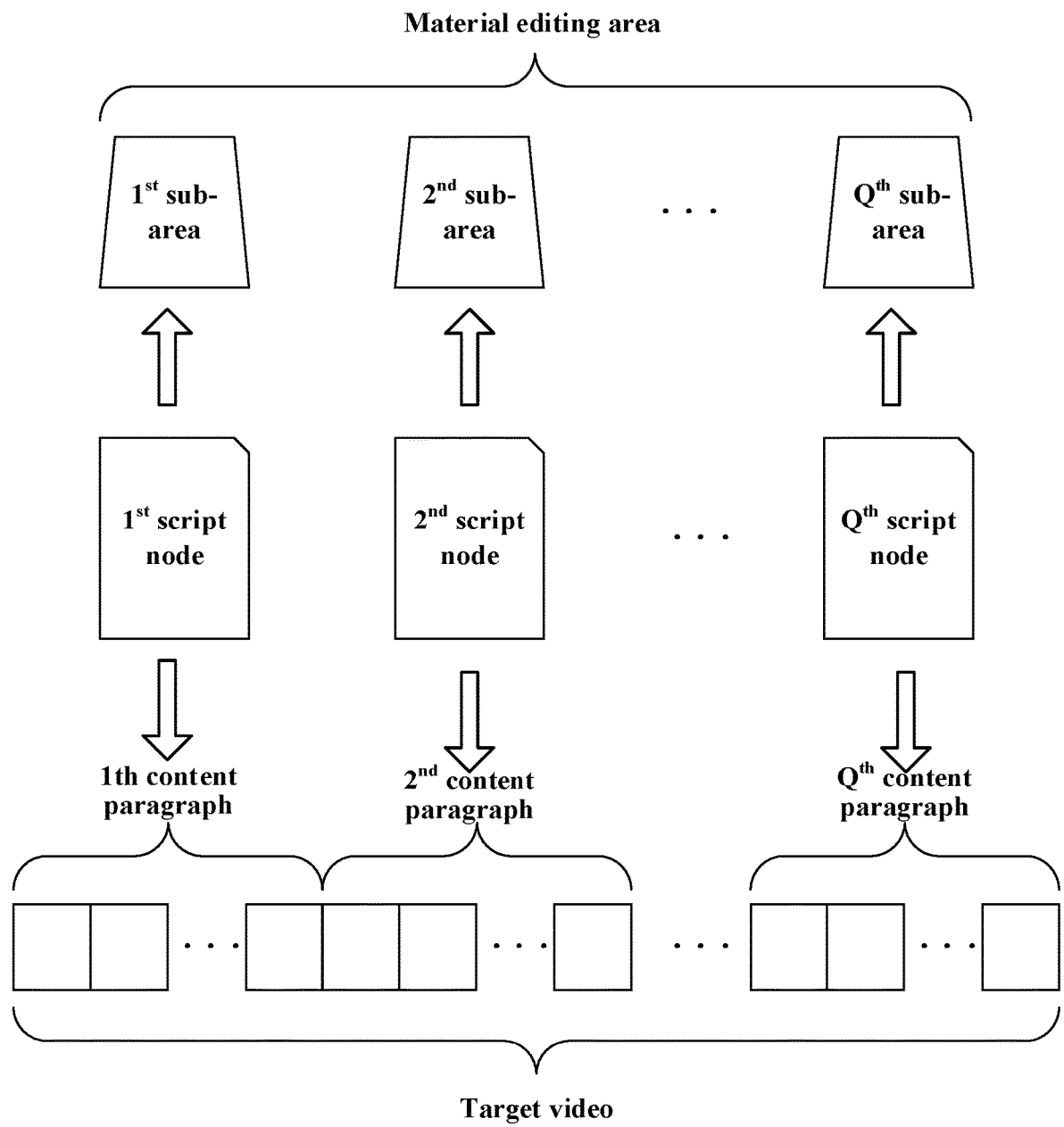
FIG. 2 illustrates a schematic diagram of a relationship among script nodes, content paragraphs, and sub-areas provided by embodiments of the present disclosure.

For convenience in understanding the relationship between the sub-areas and the script nodes in the embodiments of the present disclosure, reference will be made to FIG. 2 for further description. In FIG. 2, the first script structure includes Q script nodes, where Q is a positive integer. Based on the first script structure including Q script nodes, the material editing area may be divided into Q sub-areas, where each script node corresponds to a sub-area in the material editing area.

Figure 3A:
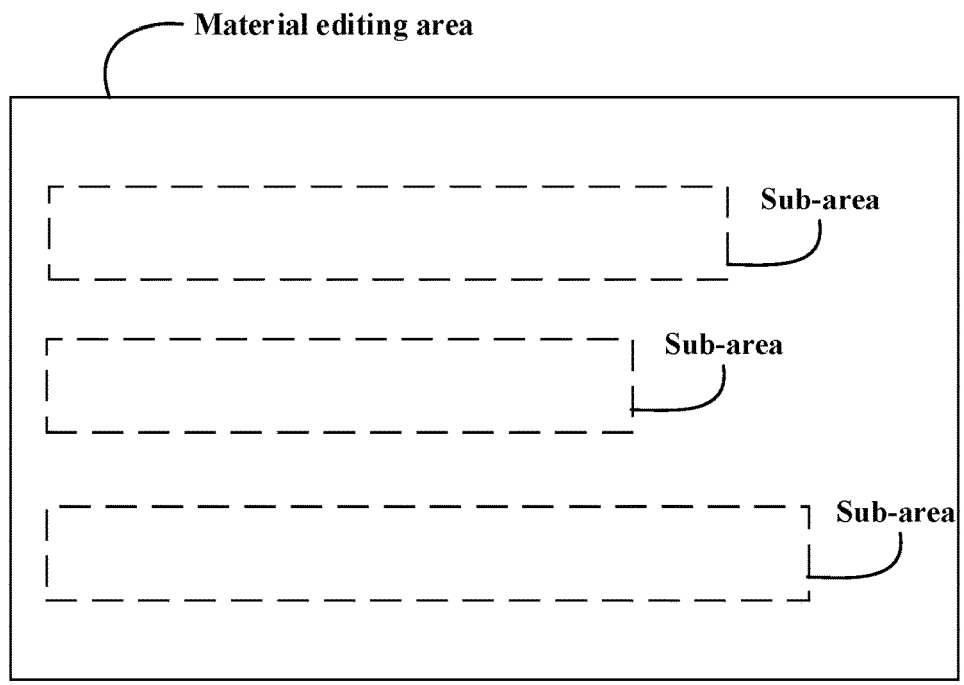
FIG. 3a illustrates a schematic diagram of an alignment method of a material editing area provided by embodiments of the present disclosure.
Figure 3B:
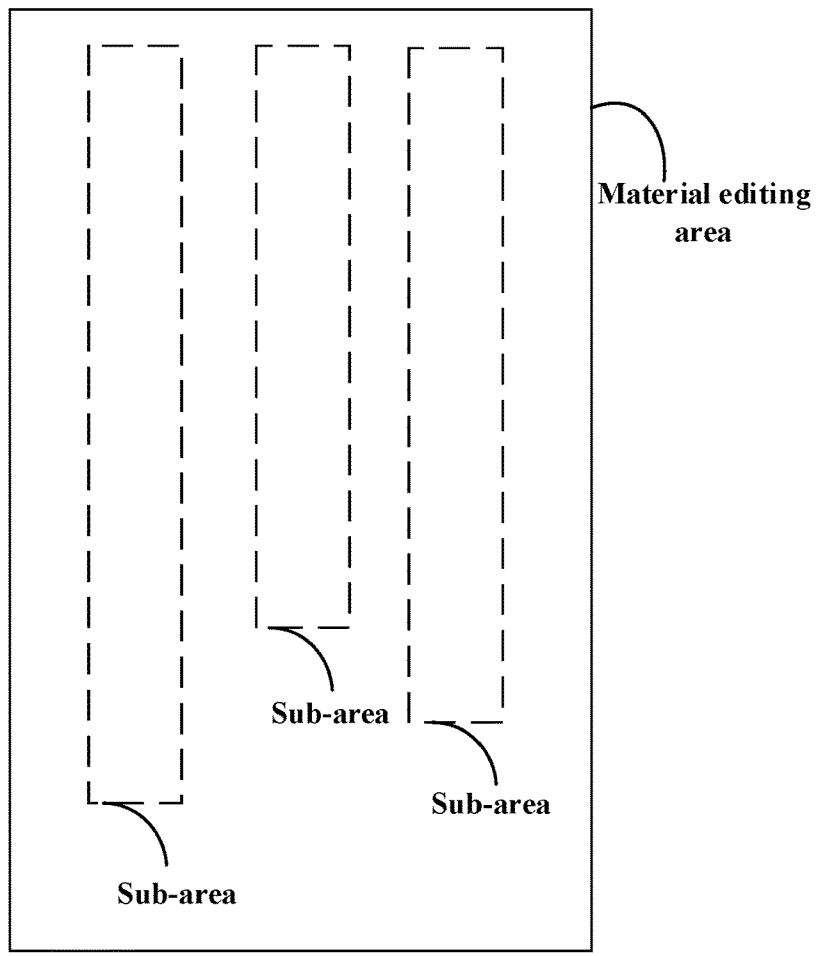
FIG. 3b illustrates a schematic diagram of a further alignment method of a material editing area provided by embodiments of the present disclosure.

It is worth noting that there are multiple interface layouts of the plurality of sub-areas in the material editing area, and one of them may be selected as required, which is not limited in the embodiments of the present disclosure. For example, a vertical alignment arrangement is shown in FIG. 3a, where different rows are aligned vertically. In FIG. 3a, the respective sub-areas are aligned to the left, or the respective sub-areas may be aligned to the right. In addition, a horizontal alignment arrangement is shown in FIG. 3b, where different columns are aligned horizontally. In FIG. 3b, the respective sub-areas are aligned upwards, or the respective sub-areas may be aligned downwards.

In an alternative implementation, a script node in the first script structure may include a script annotation and/or a script paragraph, i.e., the script node has a corresponding relationship with the script annotation and/or the script paragraph in the script. Wherein, the script annotation is used to summarize a multimedia material content corresponding to a script node, and a script paragraph includes a detailed text content corresponding to the script node. In an alternative implementation, the detailed text content included in the script paragraph may be text information obtained after performing speech recognition on a video.

Figure 4A:
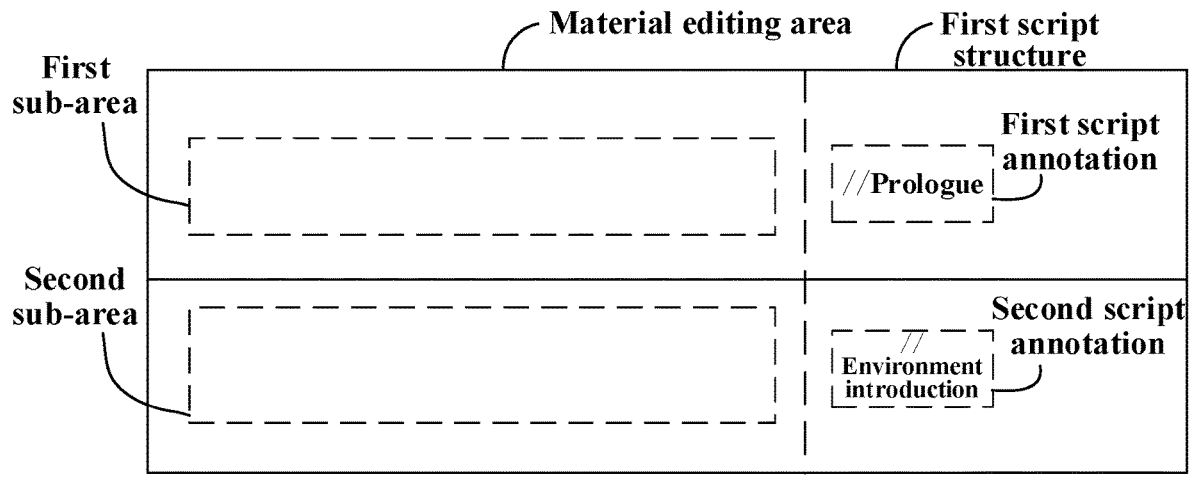
FIG. 4a illustrates a schematic diagram of a material editing area and a first script structure provided by embodiments of the present disclosure.

Specifically, example descriptions of displaying a material editing area for video editing based on a first script structure will be provided below:

Example I: script nodes in the first script structure include script annotations. As shown in FIG. 4a, it is assumed that the first script structure includes a first script annotation and a second script annotation, where the first script annotation is "//prologue," and the second script annotation is "//environment introduction." In the material editing area displayed based on the first script structure, a first sub-area of the material editing area horizontally corresponds to "//prologue," and a second sub-area of the material editing area horizontally corresponds to "//environment instruction."

Figure 4B:
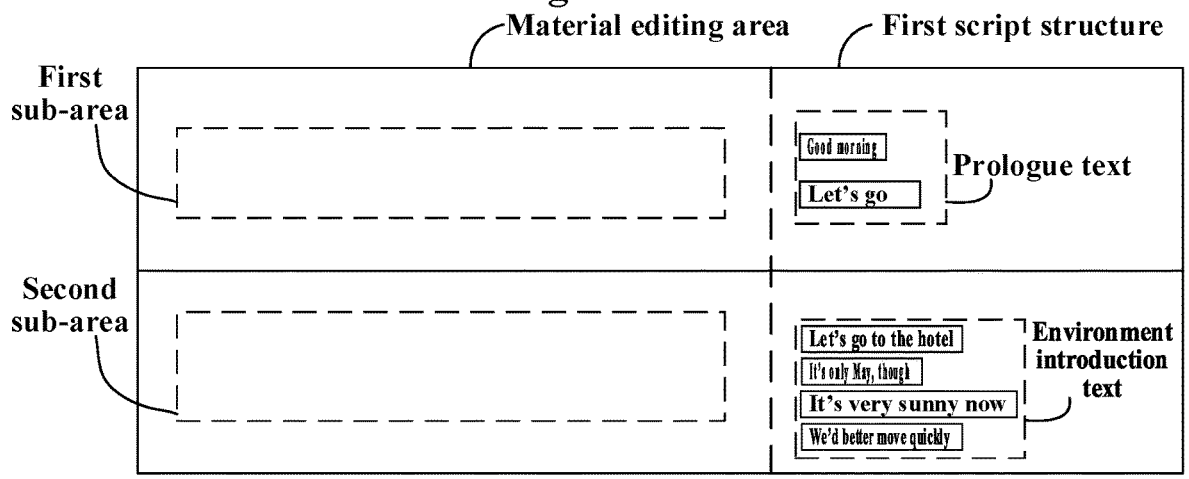
FIG. 4b illustrates a schematic diagram of a further material editing area and a first script structure provided by embodiments of the present disclosure.

Example II: script nodes in the first script structure include script paragraphs. As shown in FIG. 4b, it is assumed that the first script structure includes a first script paragraph and a second script paragraph, where the first script paragraph is a prologue text obtained through speech recognition; the second script paragraph is an environment introduction text obtained through speech recognition; a first sub-area of the material editing area horizontally corresponds to paragraphs of the prologue text; and a second sub-area of the material editing area horizontally corresponds to paragraphs of the environment introduction text.

Figure 4C:
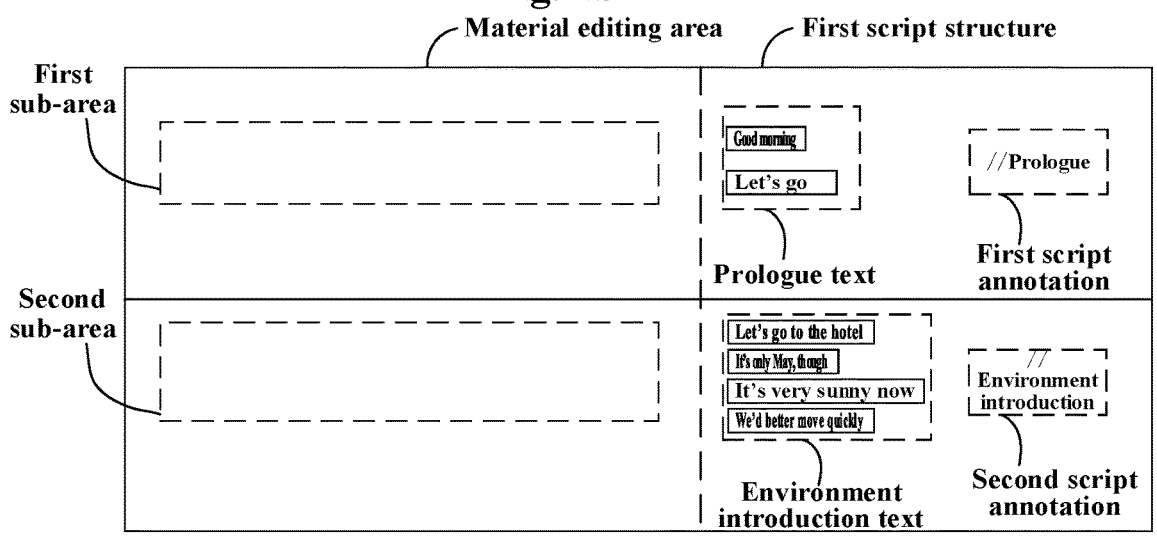
FIG. 4c illustrates a schematic diagram of a still further material editing area and a first script structure provided by embodiments of the present disclosure.

Example III: script nodes in the first script structure include script annotations and script paragraphs. As shown in FIG. 4c, it is assumed that the first script structure includes a first script node and a second script node, where the first script node includes a first script annotation which is "//prologue," and a first script paragraph which is a prologue text obtained through speech recognition; the second script node includes a first script annotation which is "//environment introduction," and a second script paragraph which is an environment introduction text obtained through speech recognition; the first sub-area in the material editing area displayed based on the first script structure, and the prologue text script paragraphs and the first script annotation in the first script structure are all horizontally correspond to one another; and the second sub-area in the material editing area, and the environment introduction text script paragraphs and the second script annotation in the first script structure all correspond to one another.

After displaying the material editing area based on the first script structure, the method proceeds to Step 102 described below.

Step 102, displaying a target multimedia material according to timeline in a target sub-area in the plurality of sub-areas.

Wherein, the target multimedia material is selected for a target script node that is the script node corresponding to the target sub-area in the first subscript structure.

In those embodiments, the target sub-area, which may be any one of the plurality of sub-areas in the material editing area, has a corresponding target script node in the first script structure, and a corresponding multimedia material can be selected based on the target script node.

In an alternative implementation, after obtaining the target multimedia material imported by a user, the target script node corresponding to the target multimedia material can be determined by performing speech recognition on the target multimedia material and matching a speech recognition result with the respective script node in the first script structure, and the target multimedia material is then displayed in the target sub-area corresponding to the target script node according to the timeline. The target multimedia material in embodiments of the present disclosure may be an entire video obtained by shooting, or may be a clip of the entire video obtained by shooting, which is not limited in the embodiments of the present disclosure.

Figure 5:
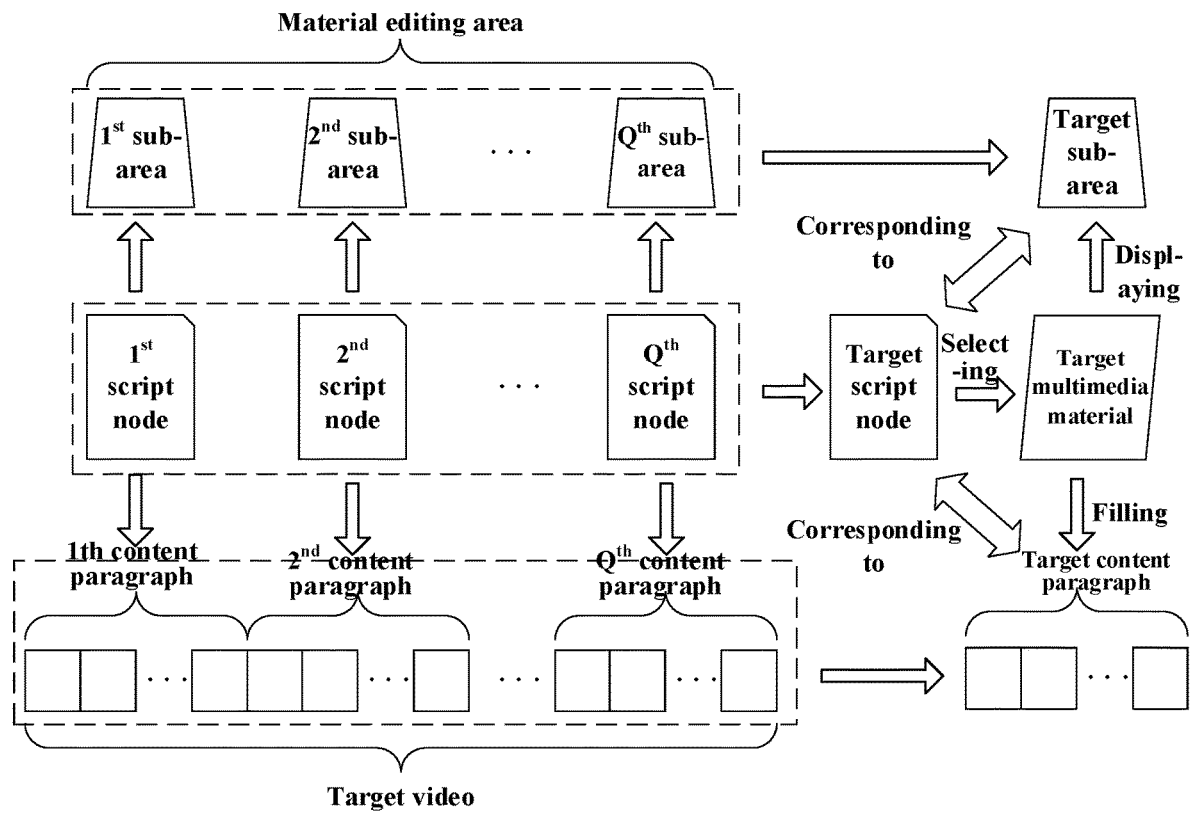
FIG. 5 illustrates a schematic diagram of a relationship among target script nodes, target sub-areas, target content paragraphs and target multimedia material provided by embodiments of the present disclosure.

For ease of understanding, referring to FIG. 5, the target multimedia material is selected based on the target script node, and the target node also corresponds to the target sub-area, such that the target multimedia material displayed in the target sub-area can be determined.

Figure 6A:
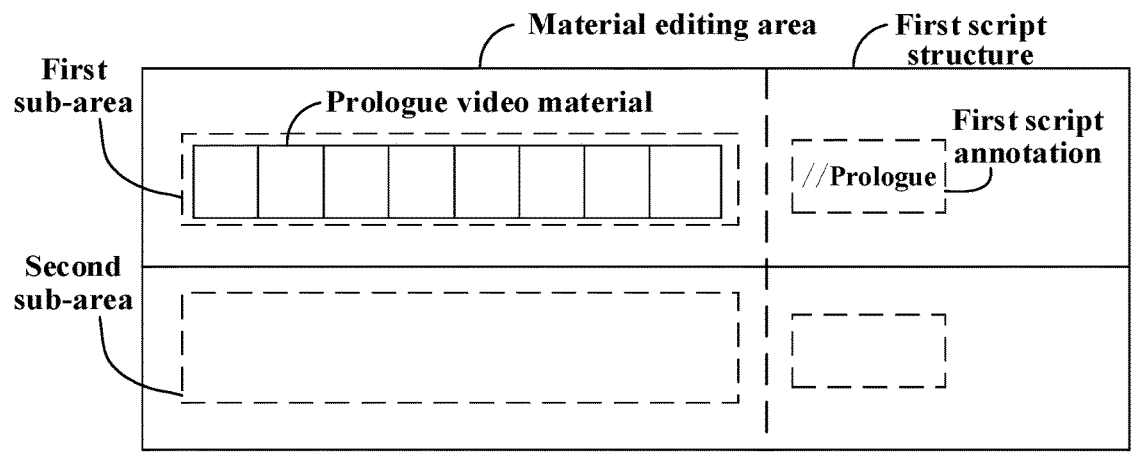
FIG. 6a illustrates a schematic diagram of displaying a target multimedia material provided by embodiments of the present disclosure.

In an alternative implementation, as shown in FIG. 6a, assumed that the first sub-area in the material editing area is the target sub-area, it is first determined that the target script node corresponding to the first sub-area in the first script structure is "//prologue," a multimedia material is then selected based on the target script node, as the target multimedia material, and further, the target multimedia material is displayed in the first sub-area.

Wherein, the method of selecting the multimedia material based on the target script node may include: by performing image recognition and/or speech recognition, and the like, on multimedia material to be selected, determining the multimedia material having the highest matching degree with the "//prologue" script node as the target multimedia material; and displaying the target multimedia material in the first sub-area.

Figure 6B:
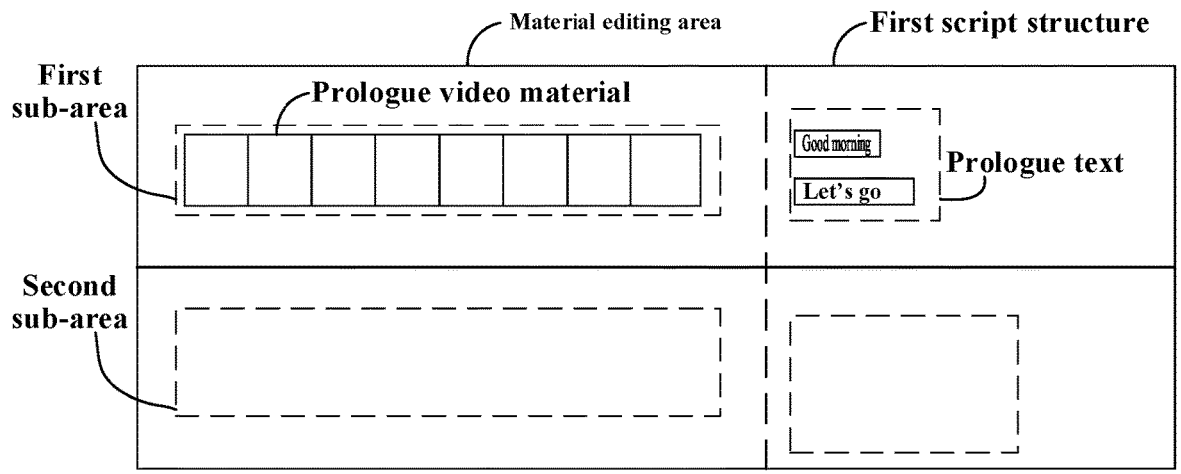
FIG. 6b illustrates a schematic diagram of displaying a further target multimedia material provided by embodiments of the present disclosure.

In a further alternative implementation, as shown in FIG. 6b, assumed that the first sub-area in the material editing area is the target sub-area and the multimedia material includes a prologue video material, a corresponding prologue text is obtained by performing speech recognition on the prologue material; the prologue text is taken as the target script node in the first script structure; the target multimedia material having the highest matching degree is selected from the multimedia material based on the prologue text (for example, a prologue video material is selected as the target multimedia material); and further, the prologue video material is displayed in the first sub-area according to the timeline.

Step 103, generating the target video based on multimedia material displayed in the material editing area.

Wherein, the target multimedia material is filled in a target content paragraph of the target video, and the target content paragraph corresponds to the target script node.

In those embodiments, subsequent to displaying the multimedia material in the respective sub-areas, the target video can be generated based on the multimedia material displayed in the material editing area.

For ease of understanding, referring to FIG. 5, the target video includes Q content paragraphs, where Q is a positive integer; each content paragraph has a corresponding relationship with a script node in the first script structure; and a multimedia material selected for a script node corresponding to a respective content paragraph may be filled in the respective content paragraph, where the multimedia material includes, but is not limited to, one or more of videos and audios.

In those embodiments, the first script structure is used to indicate a content paragraph structure of the target video. Specifically, a script node in the first script structure is used to indicate a content paragraph of the target video, i.e., the content paragraph corresponding to the script node meets the need of the script node. Therefore, the content paragraph can be adjusted based on the script node in the first script structure, to generate the target video in line with the first script structure.

Continuing with FIG. 5, the first script structure includes Q script nodes, where Q is a positive integer, and each script node has a corresponding content paragraph. A corresponding relationship among a target sub-area, a target content paragraph and a target multimedia material can be determined based on the target script node; and then, corresponding target multimedia material are filled in the respective content paragraphs, and the respective content paragraphs are spliced based on the first script structure, to thus obtain the corresponding target video.

Figure 7:
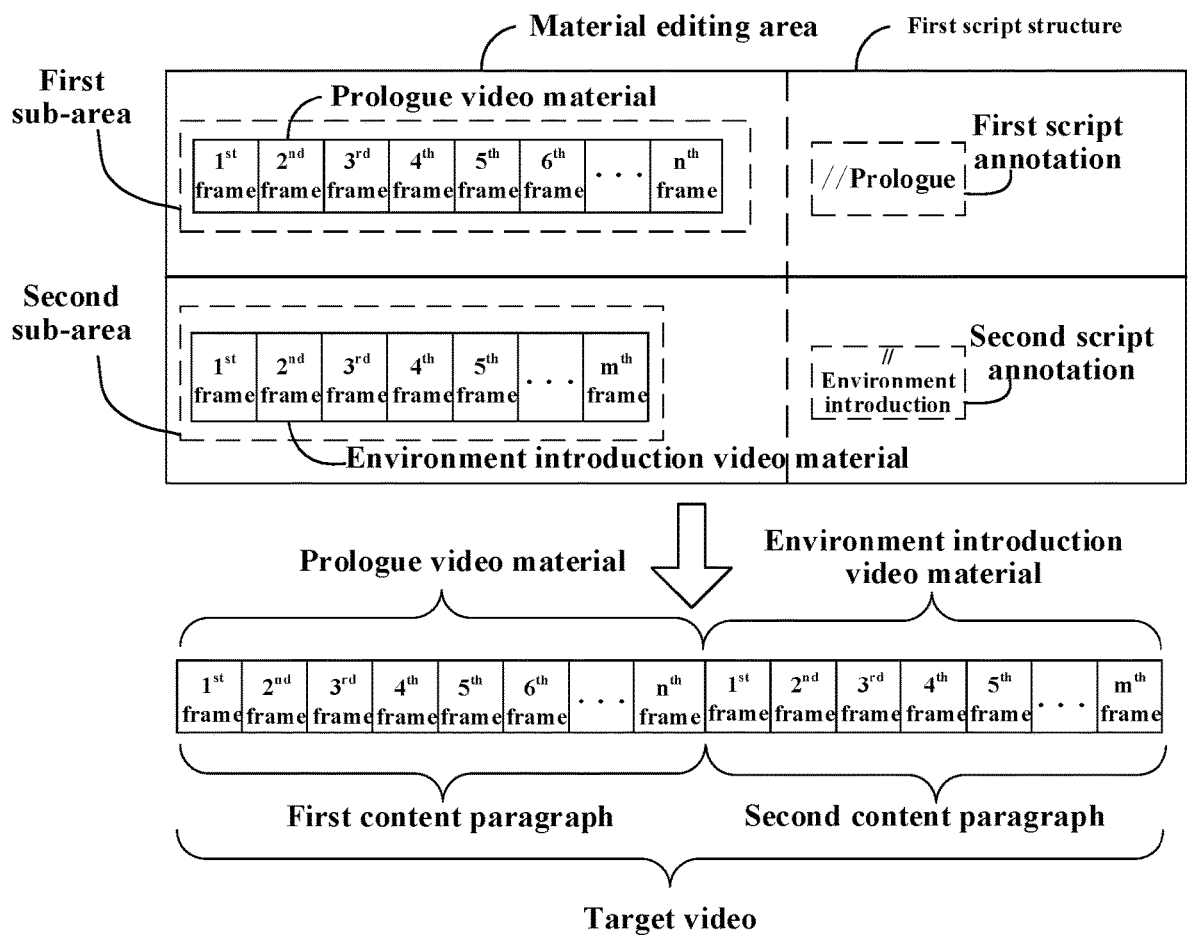
FIG. 7 illustrates a schematic diagram of generating a target video provided by embodiments of the present disclosure.

In an alternative implementation, as shown in FIG. 7, a prologue video material including n frames is displayed in the first sub-area of the material editing area, and an environment introduction material including m frames is displayed in the second sub-area of the material editing area, where n and m are positive integers. Based on the first script structure, a first content paragraph of the target video corresponding to the first sub-area, and a second content paragraph of the target video corresponding to the second sub-area are determined; then, the n-frame prologue video material is filled in the first content paragraph, and the m-frame environment introduction video material is filled in the second content paragraph, to thus generate the target video.

In a word, according to the method of video processing of embodiments of the present disclosure, a material editing area of video editing is displayed based on a first script structure, which allows sub-areas in the material editing area to correspond to the script nodes in the first script structure, respectively. Further, in a target sub-area of the material editing area, a multimedia material selected for a target script node corresponding to the target sub-area is displayed according to a timeline, and a target video is generated based on multimedia material displayed in the material editing area. Based on a material editing area including a plurality of sub-areas respectively corresponding to script nodes, embodiments of the present disclosure can implement video editing, and diversify the methods of video processing, to further meet various people's need for video editing.

In general, a video work is generated from a plurality of sub-videos. In the editing process, sub-videos are edited according to a timeline corresponding to the sub-videos, and then spliced according to a timeline corresponding to the final video. However, such timeline-based editing method is complicated in editing operation related to language contents, which requires repeated comparisons of contents per frame along the sub-video timeline. As such, the technical solution cannot enable a fast, convenient video editing operation. In the case, the video editing operation according to the above-mentioned embodiments may be employed. Specifically, prior to generating the target video based on the multimedia material displayed in the material editing area, corresponding operation steps may be added as required. The examples will be described below:

In an alternative implementation, if a corresponding clip in a multimedia material needs to be edited out due to a slip of tongue, or the like, contained therein, the following steps should be added preceding Step 103 according to the above-mentioned embodiments:

first, in response to an adjustment operation on the target text content of the first script node in the first script structure, determining a multimedia material corresponding to the first script node in the material editing area, and determining a multimedia clip corresponding to the target text content in the multimedia material.

In the example, the first script node in the first script structure has the corresponding multimedia material, and the first script node is a text content corresponding to the multimedia material. The method of acquiring the text content includes: acquiring text information, manually configured subtitles, and the like, based on a speech recognition technology. As required, a user may adjust the target text content in the first script node; in response to the adjustment, a multimedia material corresponding to the first script node is determined in the material editing area; and in order to determine a content to be adjusted, it is further required to determine a multimedia clip corresponding to the target text content in the multimedia material.

Subsequently, editing the multimedia clip in the multimedia material based on the adjustment operation. Wherein, the editing includes, but is not limited to, deleting, shifting, and the like.

For example, the target text content is "Good morning afternoon," and the multimedia material is a greeting video. The corresponding relationship between the target text content and the multimedia material is as follows: "good" corresponds to the $1^{st}$ frame of the greeting video, "morn-" corresponds to the $2^{nd}$ frame, "-ing" corresponds to the $3^{rd}$ frame, "after" corresponds to the $4^{th}$ frame, and "noon" corresponds to the $5^{th}$ frame. In this example, as "morning" is a slip of tongue, the corresponding clip should be deleted from the target video. Therefore, the operation may be performed on the target text content, i.e., "morning" is deleted from "Good morning afternoon," and the $2^{nd}$ and $3^{rd}$ frames are also deleted from the corresponding video.

In a further example, the target text content may have a corresponding relationship with the multimedia material via a timestamp. The timestamp enables an association to be established between the text content and the multimedia material. Specifically, it is assumed that the text content is "Good morning afternoon," the target text content is "morning," and the multimedia material is a greeting video. The corresponding relationship between the text content and the multimedia material is: "good" corresponds to $0^{th}$ second to $1.5^{th}$ second of the multimedia material, "morning" corresponds to $1.5^{th}$ second and $3^{rd}$ second of the multimedia material, and "afternoon" corresponding to $3^{rd}$ second and $4^{th}$ second of the multimedia material. The operation is performed on the target text content, i.e., "morning" is deleted from "Good morning afternoon," and the corresponding duration from $1.5^{th}$ second to $3^{rd}$ second of the greeting video is also deleted.

By performing the operation on the first script structure, such implementation omits the trouble of manually positioning a text to be handled according to the timeline of the multimedia material, thus improving the efficiency and accuracy of video processing.

In a further alternative implementation, if a multimedia clip needs to be added in a target video, the following steps should be added preceding Step 103 according to the above-mentioned embodiments:

first, in response to an operation of adding a text content at a target text position of the second script node in the first script structure, determining a multimedia material corresponding to the second script node in the material editing area, and determining a timeline position corresponding to the target text position in the multimedia material.

In the example, the second script node in the first script structure has a corresponding multimedia material, and the second script node is a text content corresponding to the multimedia material. There are multiple methods of acquiring the text content, including: acquiring text information, manually configured subtitles, and the like, based on a speech recognition technology. As required, a user may add the text content at the target text position of the second script node; in response to the adjustment, the multimedia material corresponding to the second script node is determined in the material editing area, and in order to determine the position of the multimedia clip to be added, it is also required to determine a timeline position corresponding to the target text position in the multimedia material.

Further, based on the operation of adding the text content, adding the multimedia clip corresponding to the text content at the timeline position in the multimedia material.

In an alternative implementation, the multimedia material before the timeline position may be determined as a front multimedia material, and the multimedia material behind the timeline position may be determined as a rear multimedia material. In the case, the adding operation may be connecting a multimedia clip after a front multimedia material, and connecting a rear multimedia material after the multimedia clip. By performing the operation on the first script structure, such implementation can omit the trouble of manually positioning the text to be added according to the timeline of the multimedia material, thus improving the efficiency and accuracy of video processing.

For example, the second script node is "Good, everyone," and the multimedia material is a greeting video. The corresponding relationship between the target content and the multimedia material is as follows: "good" corresponds to the $1^{st}$ frame of the greeting video, "every-" corresponds to the $2^{nd}$ frame of the greeting video, and "-one" corresponds to the $3^{rd}$ frame of the greeting video. In the example, "afternoon" needs to be added between "good" and "every-." In response to the operation of adding "afternoon" in the second script node, a video clip corresponding to "afternoon" is acquired, which includes a $1^{st}$ frame and a $2^{nd}$ frame of the afternoon video. Accordingly, the $1^{st}$ frame and the $2^{nd}$ frame of the afternoon video is connected after the $1^{st}$ frame of the greeting video, and the $2^{nd}$ frame of the greeting video is connected after the $2^{nd}$ frame of the afternoon video.

In another alternative implementation, an editing operation is performed on the multimedia material, and script nodes corresponding to the multimedia material are changed correspondingly. In this application scenario, the following steps should be added preceding Step 103 according to the above-mentioned embodiments:

first, in response to the editing operation on a target multimedia clip of a first multimedia material in the material editing area, determining a script node corresponding to the first multimedia material, and determining a text content corresponding to the target multimedia clip in the script node. Further, the text content in the script node is adjusted based on the editing operation.

In the example, if a user performs the editing operation on the target multimedia clip in the first multimedia material in the material editing area, it is required to perform a corresponding operation on the first script structure in response to the operation. Therefore, it is needed to determine a script node corresponding to the first multimedia material, and determine a text content corresponding to the target multimedia clip in the script node. Then, the text content in the script node is adjusted correspondingly based on the editing operation on the first multimedia material.

By way of example, the first multimedia is a greeting video. The corresponding relationship between the text content in the script node and the greeting video is as follows: "good" corresponds to the $1^{st}$ frame of the greeting video, "morn-" corresponds to the $2^{nd}$ frame, "-ing" corresponds to the $3^{rd}$ frame, "after" corresponds to the $4^{th}$ frame, and "-noon" corresponds to the $5^{th}$ frame. In the example, the $4^{th}$ and $5^{th}$ frames of the greeting video are deleted. Based on the operation of deleting the $4^{th}$ and $5^{th}$ frames of the greeting video, "after-" and "-noon" are deleted correspondingly from the text content of the script node, and the result script node is "Good morning." In this way, the changes of the multimedia material and the corresponding script node keep pace with each other, thus maintaining the consistency between the multimedia material and the script node.

In a further alternative implementation, the sequence of multimedia material can be adjusted based on the first script structure. In the case, the following steps should be added preceding Step 103 according to the above-mentioned embodiments:

first, in response to the operation of adjusting a sequence of a second script node and a third script node in the first script structure, determining sub-areas respectively corresponding to the second script node and the third script node in the material editing area. Then, based on the operation of adjusting the sequence, a sequence of multimedia material in the sub-areas respectively corresponding to the second script node and the third script node in the material editing area is adjusted.

When a user desires to adjust the sequence of the multimedia material, the second script node and the third script node in the first script structure can be adjusted. The second script node includes a corresponding second sub-area, and the third script node includes a corresponding third sub-area. In response to the adjustment, the second sub-area and the third sub-area are determined in the material editing area, and then are adjusted based on the adjustment performed by the user on the script structure. By adjusting the first script structure to adjust the sequence of the multimedia material, this example can improve the efficiency of video processing while omitting the step of manually reviewing multimedia material to determine contents of the multimedia material, making the video processing more intuitively.

By way of example, the second script in the first script structure is "//prologue," and the third script node is "//environment introduction video," where "//prologue" is positioned after "//environment introduction video," i.e., the prologue material in the corresponding material editing area is after the environment introduction material. When a user desires to shift the prologue video before the environment introduction video, "//prologue" in the first script structure can be shifted before "//environment introduction video," and in response to the operation performed by the user, the prologue material of the material editing area is shifted before the environment introduction material.

In a further alternative implementation, a plurality of videos of similar types are shot to improve quality of a generated target video, and the target multimedia material therefore includes candidate multimedia material. Then, the one with the best effect is selected from the candidate multimedia material. In the case, the following steps should be added preceding Step S103 according to the above-mentioned embodiments:

in response to a switch operation from a target multimedia material in the target sub-area to a candidate multimedia material, switching the target multimedia material displayed in the target sub-area to the candidate multimedia material.

In the example, the candidate multimedia material may be set by a user, or may be acquired through similarity comparison with the target multimedia material via an image and speech recognition technology. The user can switch the target multimedia material to the candidate multimedia material, and in response to the switching operation, the target multimedia material displayed in the material editing area is switched to the candidate multimedia material. It would be appreciated that the target script node corresponding to the target sub-area in the first script structure could be adjusted, based on the candidate multimedia material, to text information corresponding to the candidate multimedia material. By means of the candidate operation, this example can enable convenient, quick selection of the one best meeting the user's need from a plurality of multimedia material, thus improving the efficiency of video processing.

Figure 8:
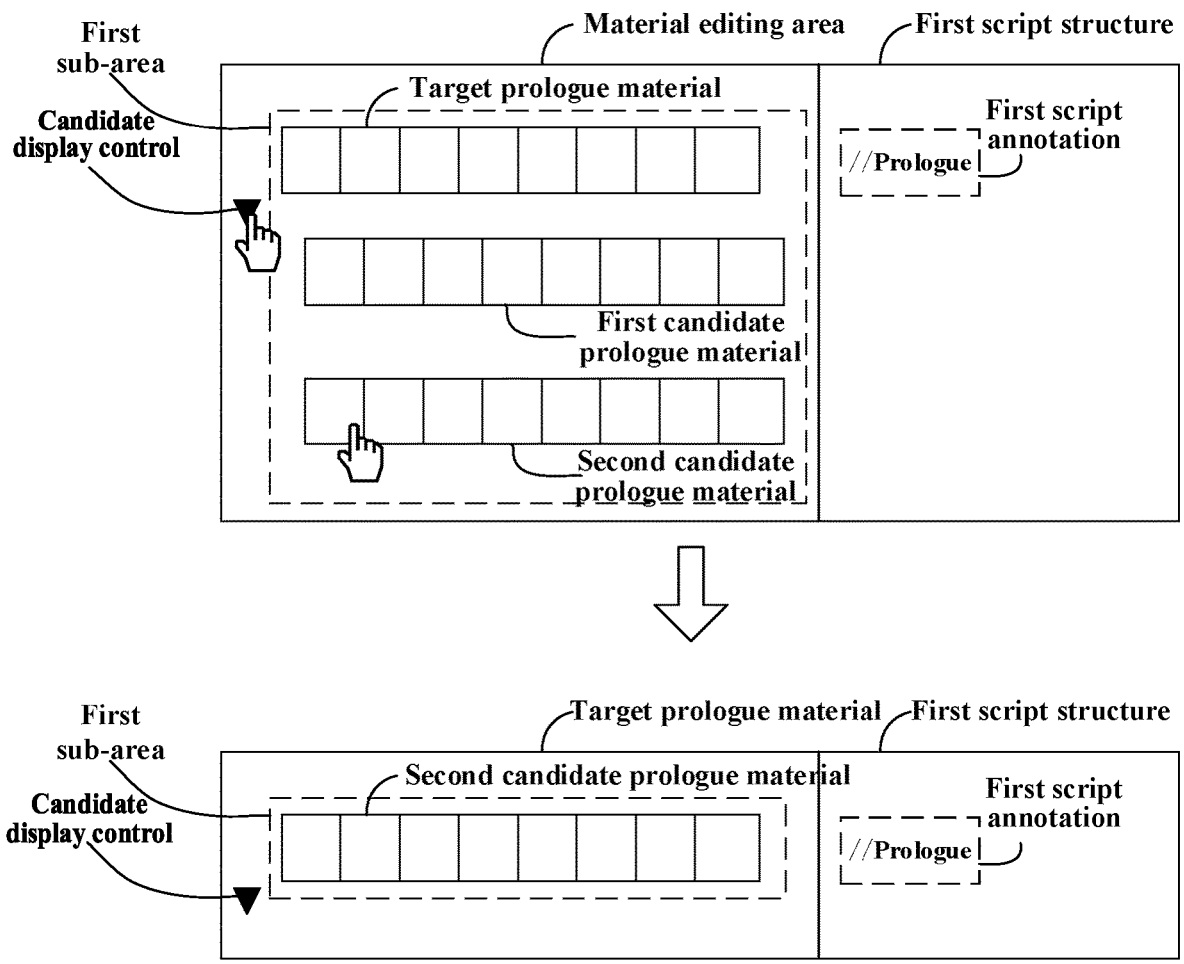
FIG. 8 illustrates a schematic diagram of switching between a target multimedia material and a candidate multimedia material provided by embodiments of the present disclosure.

By way of example, as shown in FIG. 8, the target sub-area is the first sub-area, the target multimedia material in the first sub-area is a target prologue material, the candidate multimedia material include a first candidate multimedia material and a second candidate multimedia material, and the material candidate area further includes a candidate display control for displaying candidate multimedia material in the first sub-area in response to a touch operation of the user. In the example, the user touches the candidate display control and then clicks the second candidate prologue material to replace the target multimedia material such that the second candidate prologue material is displayed in the first sub-area.

In view of the above, the method of video processing according to embodiments of the present disclosure enables an intuitive, convenient adjustment of a target video and/or a first script structure based on a corresponding relationship among sub-areas, content paragraphs and multimedia material, which is established based on the first script structure, while reducing the complexity of editing processing focusing on language contents or a plot, thus improving the processing efficiency.

Figure 9:
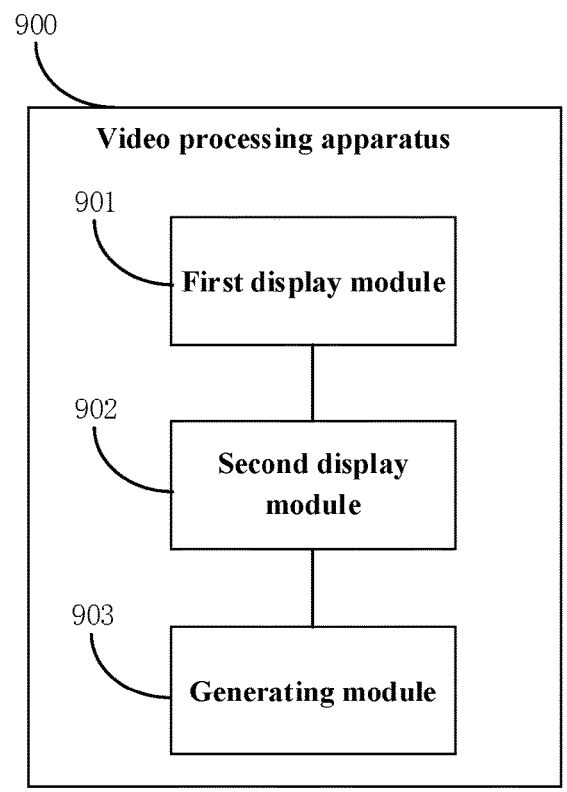
FIG. 9 illustrates a schematic diagram of a structure of a video processing apparatus provided by embodiments of the present disclosure.

Based on the above method embodiments, the present disclosure further provides a video processing apparatus. FIG. 9 is a schematic diagram of a structure of a video processing apparatus provided by embodiments of the present disclosure. The apparatus includes:

a first displaying module 901 for displaying a material editing area for video editing based on a first script structure, wherein the material editing area is divided into a plurality of sub-areas, asub-area is corresponds to one script node in the first script structure, the first script structure is used to indicate a content paragraph structure of a target video, and a script node is used to indicate a content paragraph of the target video;

a second displaying module 902 for displaying a target multimedia material according to a timeline in a target sub-area in the plurality of sub-areas, wherein the target multimedia material is selected for a target script node that is a script node corresponding to the target sub-area in the first script structure; and a generating module 903 for generating the target video based on multimedia material displayed in the material editing area, where the target multimedia material is filled in a target content paragraph of the target video, and the target content paragraph corresponds to the target script node.

In an alternative implementation, an interface layout of the plurality of sub-areas in the material editing material is a vertical alignment arrangement.

In an alternative implementation, the apparatus further includes:

a first determining module for, in response to an adjustment operation on a target text content of a first script node in the first script structure, determining a multimedia material corresponding to the first script node in the material editing area, and determining a multimedia clip corresponding to the target text content in the multimedia material; and an editing module for editing the multimedia clip in the multimedia material based on the adjustment operation.

In an alternative implementation, the apparatus further includes:

a second determining module for, in response to an operation of adding a text content at a target text position of a second script node in the first script structure, determining a multimedia material corresponding to the second script node in the material editing area, and determining a timeline position corresponding to the target text position in the multimedia material; and an adding module for adding a multimedia clip corresponding to the text content at the timeline position in the multimedia material based on the operation of adding the text content.

In an alternative implementation, the apparatus further includes:

a third determining module for, in response to an editing operation on a target multimedia clip of a first multimedia material in the material editing area, determining a script node corresponding to the first multimedia material, and determining a text content corresponding to the target multimedia clip in the script node; and a first adjustment module for adjusting the text content in the script node based on the editing operation.

In an alternative implementation, the apparatus further includes:

a fourth determining module for, in response to an operation of adjusting a sequence of a second script node and a third script node in the first script structure, determining sub-areas respectively corresponding to the second script node and the third script node in the material editing area; and a second adjustment module for adjusting, based on the operation of adjusting the sequence, a sequence of multimedia material in the sub-areas respectively corresponding to the second script node and the third script node in the material editing area.

In an alternative implementation, the target multimedia material includes a candidate multimedia material, and the apparatus further includes:

a switching module for, in response to a switching operation on the target multimedia material in the target sub-area to the candidate multimedia material, switching the target multimedia material displayed in the target sub-area to the candidate multimedia material.

In the video processing apparatus provided by embodiments of the present disclosure, the material editing area for video editing is displayed based on the first script structure, which allows sub-areas in the material editing area to respectively correspond to script nodes in the first script structure. In addition, in the target sub-area of the material editing area, a multimedia material selected for a target script node corresponding to the target sub-area is displayed according to a timeline, and the target video is then generated based on multimedia material displayed in the material editing area. Based on a material editing area including a plurality of sub-areas corresponding to script nodes, the embodiments of the present disclosure implements video editing, and diversify methods of video processing, to further meet various users' need for video editing.

In addition to the method and apparatus describe above, embodiments of the present disclosure further provide a computer readable storage medium having instructions stored therein, where the instructions, when running on a terminal device, cause the terminal device to implement the method of video processing according to the embodiments of the present disclosure.

The embodiments of the present disclosure also provide a computer program product including computer programs/instructions, where the computer programs/instructions, when executed, implement the method of video processing according to the embodiments of the present disclosure.

Figure 10:
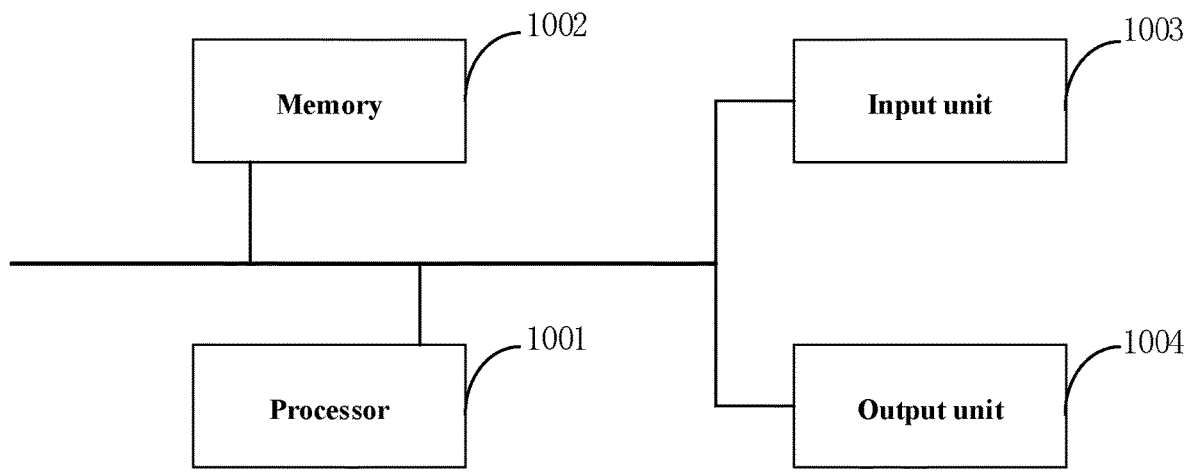
FIG. 10 illustrates a schematic diagram of a structure of a video processing device provided by embodiments of the present disclosure.

Furthermore, the embodiments of the present disclosure provide a video processing device, which may include the following components, as shown in FIG. 10:

a processor 1001, a memory 1002, input unit 1003 and output unit 1004. There may be one or more processors 1001 in the video processing device, where one processor is shown in FIG. 10 as an example. In some embodiments of the present disclosure, the processor 1001, the memory 1002, the input unit 1003 and the output unit 1004 are connected via a bus or in other manner, where a bus connection is shown in FIG. 10 as an example.

The memory 1002 may be used to store software programs and modules, and the processor 1001 runs the software programs and modules stored in the memory 1002 to execute various types of functional applications and data processing of the video processing device. The memory 1002 may mainly include a program storage zone and a data storage zone, where the program storage zone may store an operating system, an application program required by at least one function, and the like. In addition, the memory 1002 may include a high-speed random access memory, and may further include a non-volatile memory, such as at least one disk storage device, flash device, or other volatile solid-state storage device. The input unit 1003 may be used to receive number or character information input therein, and generate a signal input related to user settings and functional control of the video processing device.

In those embodiments, the processor 1001 can load executable files corresponding to a process of one or more application programs into the memory 1002 and run the application programs stored in the memory 1002, to thus implement various functions of the video processing device as mentioned above.

It is worth noting that, the relationship terms, such as "first," "second," and the like, are only used to differentiate an entity or operation from a further entity or operation, without necessarily requiring or indicating that those entitles or operations have any actual relationship or be placed in any sequence. The term "include," "comprise," or any other variant, is to be read as non-exclusive inclusion, i.e., a process, method, article, or device including a series of elements not only covers elements listed thereafter but also comprises other elements not listed explicitly, or may include all elements inherent to the process, method, article or device. Without further limitation, an element defined by "includes a . . . " does not exclude the presence of a further identical element in the process, method, article, or device including the element.

The description above only relates to specific implementations of the present disclosure to help those skilled in the art understand or implement the present disclosure. Multiple modifications to those embodiments are obvious to those skilled in the art, and the general principles defined here can be implemented in other embodiments in the premise of not departing from the spirits or scope of the present disclosure. Therefore, the present disclosure claims the broadest scope conforming to the principles and novel features disclosed here, rather than being limited to those embodiments described above.

We claim:

1. A method of video processing, comprising:
   displaying, based on a first script structure, a material editing area for video editing, wherein the material editing area is divided into a plurality of sub-areas, each of a subset of the plurality of sub-areas corresponding to a script node among a plurality of script nodes in the first script structure, the first script structure is indicative of a content paragraph structure of a target video, and each of the plurality of script nodes is indicative of a content paragraph of the target video;
   displaying a target multimedia material according to a timeline in a target sub-area of the plurality of sub-areas, wherein the target multimedia material is selected for a target script node which is the script node corresponding to the target sub-area in the first script structure; and
   generating the target video based on multimedia material displayed in the material editing area, wherein the target multimedia material is filled in a target content paragraph of the target video, and the target content paragraph is corresponding to the target script node.

2. The method of claim 1, wherein an interface layout of the plurality of sub-areas in the material editing area is a vertical alignment arrangement.

3. The method of claim 1, prior to generating the target video based on the multimedia material displayed in the material editing area, the method further comprises:
   in response to an adjustment operation on a target text content of a first script node in the first script structure, determining a multimedia material corresponding to the first script node in the material editing area, and determining a multimedia clip corresponding to the target text content in the multimedia material; and
   editing, based on the adjustment operation, the multimedia clip in the multimedia material.

4. The method of claim 1, prior to generating the target video based on the multimedia material displayed in the material editing area, the method further comprises:
   in response to an operation of adding a text content at a target text position of a second script node in the first script structure, determining a multimedia material corresponding to the second script node in the material editing area, and determining a timeline position corresponding to the target text position in the multimedia material; and
   adding, based on the operation of adding the text content, adding a multimedia clip corresponding to the text content at the timeline position in the multimedia material.

5. The method of claim 1, prior to generating the target video based on the multimedia material displayed in the material editing area, the method further comprises:
   in response to an editing operation on a target multimedia clip of a first multimedia material in the material editing area, determining the script node corresponding to the first multimedia material, and determining a text content corresponding to the target multimedia clip in the script node; and
   adjusting, based on the editing operation, the text content in the script node.

6. The method of claim 1, prior to generating the target video based on the multimedia material displayed in the material editing area, the method further comprises:
   in response to an operation of adjusting a sequence of a second script node and a third script node in the first script structure, determining sub-areas respectively corresponding to the second script node and the third script node in the material editing area; and
   adjusting, based on the operation of adjusting the sequence, a sequence of multimedia material in the sub-areas respectively corresponding to the second script node and the third script node in the material editing area.

7. The method of claim 1, wherein the target multimedia material comprises a candidate multimedia material, and prior to generating the target video based on the multimedia material displayed in the material editing area, and the method further comprises:
   in response to a switching operation from the target multimedia material in the target sub-area to the candidate multimedia material, switching the target multimedia material displayed in the target sub-area to the candidate multimedia material.

8. A device comprising a memory, a processor, and computer programs stored in the memory and operable on the processor, the processor, when executing the computer programs, implementing the method of:
   displaying, based on a first script structure, a material editing area for video editing, wherein the material editing area is divided into a plurality of sub-areas, each of a subset of the plurality of sub-areas corresponding to a script node among a plurality of script nodes in the first script structure, the first script structure is indicative of a content paragraph structure of a target video, and each of the plurality of script nodes is of a content paragraph of the target video;
   displaying a target multimedia material according to a timeline in a target sub-area of the plurality of sub-areas, wherein the target multimedia material is selected for a target script node which is the script node corresponding to the target sub-area in the first script structure; and generating the target video based on multimedia material displayed in the material editing area, wherein the target multimedia material is filled in a target content paragraph of the target video, and the target content paragraph is corresponding to the target script node.

9. The device of claim 8, wherein an interface layout of the plurality of sub-areas in the material editing area is a vertical alignment arrangement.

10. The device of claim 8, prior to generating the target video based on the multimedia material displayed in the material editing area, the method further comprises:
in response to an adjustment operation on a target text content of a first script node in the first script structure, determining a multimedia material corresponding to the first script node in the material editing area, and determining a multimedia clip corresponding to the target text content in the multimedia material; and
editing, based on the adjustment operation, the multimedia clip in the multimedia material.

11. The device of claim 8, prior to generating the target video based on the multimedia material displayed in the material editing area, the method further comprises:
in response to an operation of adding a text content at a target text position of a second script node in the first script structure, determining a multimedia material corresponding to the second script node in the material editing area, and determining a timeline position corresponding to the target text position in the multimedia material; and
adding, based on the operation of adding the text content, adding a multimedia clip corresponding to the text content at the timeline position in the multimedia material.

12. The device of claim 8, prior to generating the target video based on the multimedia material displayed in the material editing area, the method further comprises:
in response to an editing operation on a target multimedia clip of a first multimedia material in the material editing area, determining the script node corresponding to the first multimedia material, and determining a text content corresponding to the target multimedia clip in the script node; and
adjusting, based on the editing operation, the text content in the script node.

13. The device of claim 8, prior to generating the target video based on the multimedia material displayed in the material editing area, the method further comprises:
in response to an operation of adjusting a sequence of a second script node and a third script node in the first script structure, determining sub-areas respectively corresponding to the second script node and the third script node in the material editing area; and
adjusting, based on the operation of adjusting the sequence, a sequence of multimedia material in the sub-areas respectively corresponding to the second script node and the third script node in the material editing area.

14. A computer program product being stored on a non-transitory computer storage medium and comprising computer programs/instructions which, when executed by a processor, implement the method of:
displaying, based on a first script structure, a material editing area for video editing, wherein the material editing area is divided into a plurality of sub-areas, each of a subset of the plurality of sub-areas corresponding to a script node among a plurality of script nodes in the first script structure, the first script structure is indicative of a content paragraph structure of a target video, and each of the plurality of script nodes is indicative of a content paragraph of the target video;
displaying a target multimedia material according to a timeline in a target sub-area of the plurality of sub-areas, wherein the target multimedia material is selected for a target script node which is the script node corresponding to the target sub-area in the first script structure; and
generating the target video based on multimedia material displayed in the material editing area, wherein the target multimedia material is filled in a target content paragraph of the target video, and the target content paragraph is corresponding to the target script node.

15. The computer program product of claim 14, wherein an interface layout of the plurality of sub-areas in the material editing area is a vertical alignment arrangement.

16. The computer program product of claim 14, prior to generating the target video based on the multimedia material displayed in the material editing area, the method further comprises:
in response to an adjustment operation on a target text content of a first script node in the first script structure, determining a multimedia material corresponding to the first script node in the material editing area, and determining a multimedia clip corresponding to the target text content in the multimedia material; and
editing, based on the adjustment operation, the multimedia clip in the multimedia material.

17. The computer program product of claim 14, prior to generating the target video based on the multimedia material displayed in the material editing area, the method further comprises:
in response to an operation of adding a text content at a target text position of a second script node in the first script structure, determining a multimedia material corresponding to the second script node in the material editing area, and determining a timeline position corresponding to the target text position in the multimedia material; and
adding, based on the operation of adding the text content, adding a multimedia clip corresponding to the text content at the timeline position in the multimedia material.

18. The computer program product of claim 14, prior to generating the target video based on the multimedia material displayed in the material editing area, the method further comprises:
in response to an editing operation on a target multimedia clip of a first multimedia material in the material editing area, determining the script node corresponding to the first multimedia material, and determining a text content corresponding to the target multimedia clip in the script node; and
adjusting, based on the editing operation, the text content in the script node.

19. The computer program product of claim 14, prior to generating the target video based on the multimedia material displayed in the material editing area, the method further comprises:
in response to an operation of adjusting a sequence of a second script node and a third script node in the first script structure, determining sub-areas respectively corresponding to the second script node and the third script node in the material editing area; and
adjusting, based on the operation of adjusting the sequence, a sequence of multimedia material in the sub-areas respectively corresponding to the second script node and the third script node in the material editing area.

20. The computer program product of claim 14, wherein the target multimedia material comprises a candidate multimedia material, and prior to generating the target video based on the multimedia material displayed in the material editing area, and the method further comprises:
- in response to a switching operation from the target multimedia material in the target sub-area to the candidate multimedia material, switching the target multimedia material displayed in the target sub-area to the candidate multimedia material.

* * * * *